United States Patent
Nasielski et al.

(10) Patent No.: US 8,249,021 B2
(45) Date of Patent: *Aug. 21, 2012

(54) METHODS AND APPARATUSES FOR CDMA2000/GPRS ROAMING

(75) Inventors: John W. Nasielski, San Diego, CA (US); Raymond T. Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/690,584

(22) Filed: Jan. 20, 2010

(65) Prior Publication Data

US 2010/0157946 A1    Jun. 24, 2010

Related U.S. Application Data

(63) Continuation of application No. 10/996,425, filed on Nov. 23, 2004, now Pat. No. 7,675,885.

(60) Provisional application No. 60/526,557, filed on Dec. 3, 2003.

(51) Int. Cl.
*H04W 4/00* (2009.01)

(52) U.S. Cl. ............... 370/331; 370/328; 455/432.1; 455/435.1

(58) Field of Classification Search .......... None
See application file for complete search history.

(56) References Cited

U.S. PATENT DOCUMENTS

| | | | |
|---|---|---|---|
| 5,862,481 A * | 1/1999 | Kulkarni et al. ........... 455/432.2 | |
| 6,603,761 B1 | 8/2003 | Wang et al. | |
| 6,708,031 B2 | 3/2004 | Purnadi et al. | |
| 6,711,147 B1 | 3/2004 | Barnes et al. | |
| 6,912,389 B2 | 6/2005 | Bright et al. | |
| 6,978,128 B1 | 12/2005 | Raman et al. | |
| 7,039,404 B2 * | 5/2006 | Das et al. ........... 455/435.1 | |
| 7,061,887 B2 | 6/2006 | Fan | |
| 7,236,781 B2 | 6/2007 | Patil et al. | |
| 7,272,379 B1 | 9/2007 | Tang et al. | |
| 7,298,847 B2 | 11/2007 | Jing et al. | |
| 7,418,596 B1 | 8/2008 | Carroll et al. | |
| 7,675,885 B2 * | 3/2010 | Nasielski et al. ........... 370/331 |
| 7,773,554 B2 * | 8/2010 | Nasielski et al. ........... 370/328 |
| 2002/0167906 A1 | 11/2002 | La Porta et al. | |
| 2003/0053435 A1 | 3/2003 | Sindhushayana et al. | |
| 2003/0067891 A1 | 4/2003 | Jones et al. | |

(Continued)

FOREIGN PATENT DOCUMENTS

EP    1137300 A1    9/2001

(Continued)

OTHER PUBLICATIONS

Written Opinion—PCT/US04/040430, International Search Authority—European Patent Office Apr. 15, 2005.

(Continued)

*Primary Examiner* — Erika Gary
(74) *Attorney, Agent, or Firm* — Kam T. Tam; Charles E. Eggers

(57) ABSTRACT

IIF architectures and corresponding call flows are provided for CDMA2000/GPRS roaming scenarios such as GPRS foreign mode with Mobile IPv4, GPRS foreign mode with Simple IPv4 or IPv6, CDMA2000 packet data foreign mode with Mobile IPv4, and CDMA2000 packet data foreign mode with Simple IPv4 or IPv6.

41 Claims, 9 Drawing Sheets

GPRS native subscriber roaming to CDMA 2000 packet data system and using Mobile IPv 4

Visited
CDMA 2000 Packet Data System

Home
GPRS System

U.S. PATENT DOCUMENTS

| | | | |
|---|---|---|---|
| 2003/0114155 | A1 | 6/2003 | Jain et al. |
| 2003/0186676 | A1 | 10/2003 | Ogman et al. |
| 2003/0208602 | A1 | 11/2003 | Bhalla et al. |
| 2005/0135318 | A1 | 6/2005 | Walton et al. |

FOREIGN PATENT DOCUMENTS

| | | | |
|---|---|---|---|
| JP | 2002232962 | | 8/2002 |
| JP | 2002320255 | A | 10/2002 |
| JP | 2002330179 | A | 11/2002 |
| JP | 2003018195 | A | 1/2003 |
| JP | 2003511982 | A | 3/2003 |
| JP | 2003533094 | A | 11/2003 |
| JP | 2005-513886 | | 5/2005 |
| JP | 2005516546 | A | 6/2005 |
| KR | 20020047204 | | 6/2002 |
| WO | 9709833 | | 3/1997 |
| WO | WO0079827 | A1 | 12/2000 |
| WO | WO0128185 | A1 | 4/2001 |
| WO | WO0184765 | A2 | 11/2001 |
| WO | 03053078 | | 6/2003 |
| WO | WO03065682 | A1 | 8/2003 |
| WO | WO03086002 | A1 | 10/2003 |

OTHER PUBLICATIONS

3GPP: "3rd Generation Partnership Project; Technical Specification Group Core Network; Numbering, Addressing and Identification (Release 6)," 3GPP TS 23.003 V.6.4.0, pp. 1-44 (Sep. 2004).

3GPP: "TS 29.061 V4.8.0: IW between the PLMN supporting packet based services and PDN (Release 4)" 3GPP TS 29.061 V4.8.0, Jun. 2003, pp. 1-63, XP002282367.

3GPP2 P.S0001-A; "Wireless IP Network Standard," 3rd Generation Partnership Project 2 "3GPP2." pp. 1-61, XP002258147, Jul. 16, 2001.

3GPP2 X.S0011-003-C, Version 1.0.0; 3rd Generation Partnership Project 2 "3GPP2" cdma2000 Wireless IP Network standard: Packet Data Mobility and Resource Management, pp. 1-24 (Aug. 2003) XP-002374163.

Calhoun, P., Sun Microsystems Laboratories, C Perkins, Nokia Research Center, "Mobile IP Network Access Identifier Extension for IPv4," IETF Standard, Internet Engineering Task Force, IETF, CH, pp. 1-6 Mar. 2000.

International Search Report, PCT/US2004/040430—International Search Authority—European Patent Office, Apr. 15, 2005.

Murphy T: "The CDMA2000 Packet Core Network" Feb. 1, 2001, on—Ericsson Review, Ericsson. Stockholm, SE, pp. 88-95, XP001006663 ISSN: 0014-0171.

Perkins, C., "IP Mobility Support," IBM, Network Working Group, Request for Comments: 2002, pp. 1-79 (Oct. 1996).

Perkins, C.: "Mobile IPv4 Challenge/Response Extensions," Network Working Group, Request for Comments 3012, pp. 1-16 (Nov. 2000).

Perkins, C.: "Mobility IP Network Access Identifier Extension for IPv4," Network Working Group, Request for Comments 2794, pp. 1-74 (Mar. 2000).

TIA/EIA/IS-835 CDMA 2000 Wireless IP Network Standard, TIA/EIA Interim Standard, Page complete 60, XP002261671.

Taiwan Search Report—TW093137557—TIPO—Jan. 20, 2012.

* cited by examiner

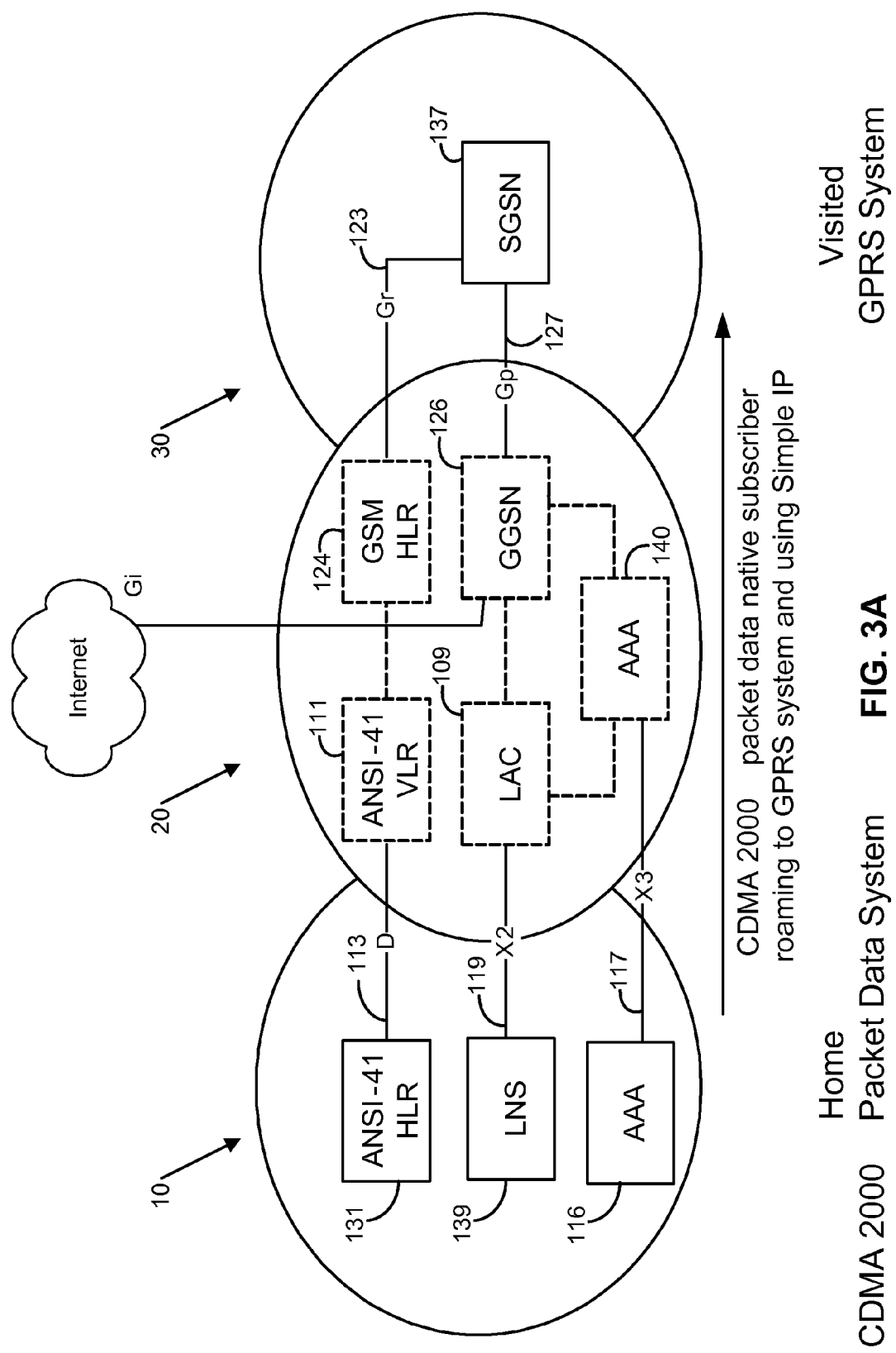

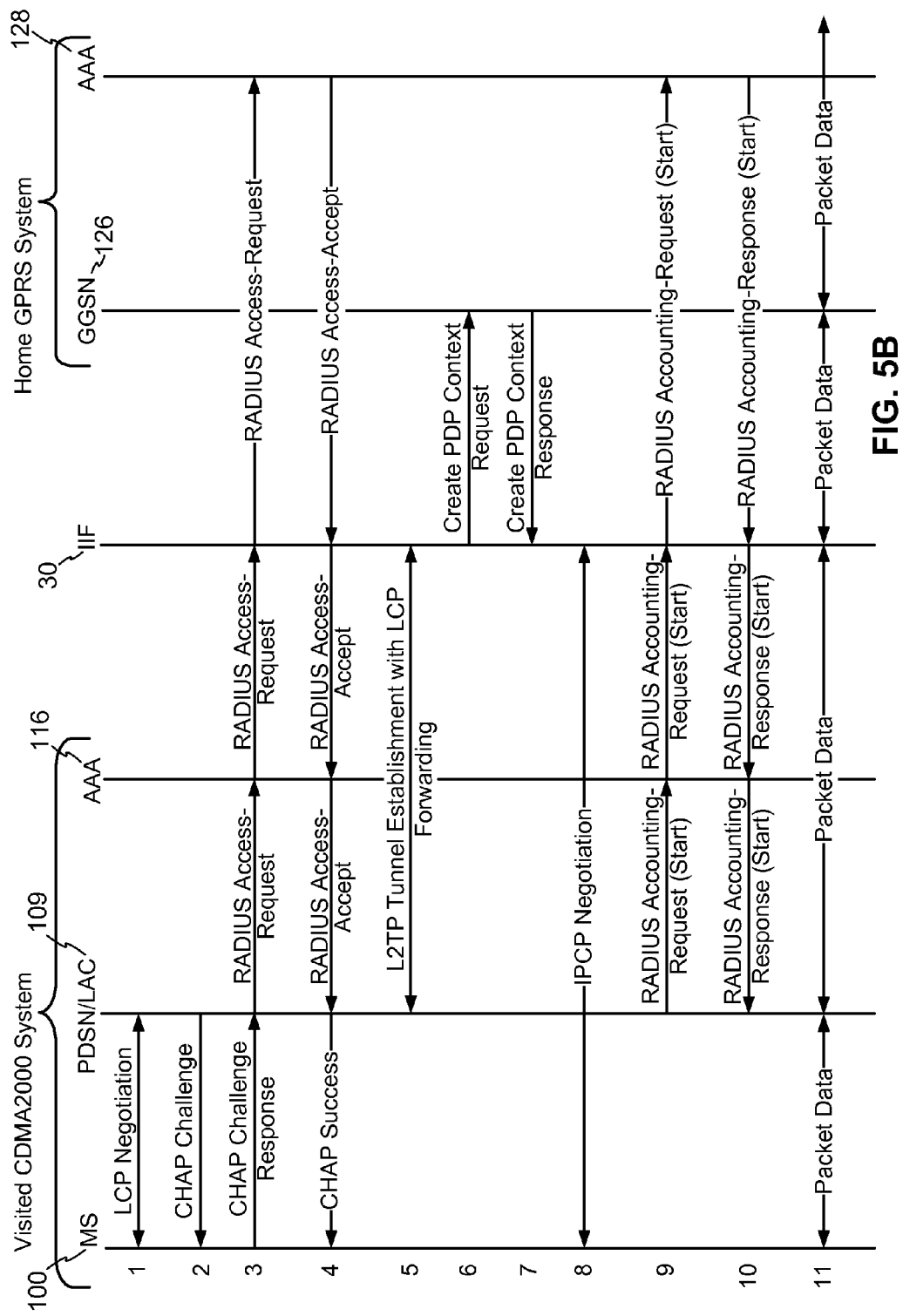

METHODS AND APPARATUSES FOR CDMA2000/GPRS ROAMING

CLAIM OF PRIORITY UNDER 35 U.S.C. §119

The present application for patent is a continuation of application Ser. No. 10/996,425 filed Nov. 23, 2004 entitled "METHODS AND APPARATUSES FOR DCMA2000/GPRS ROAMING," issued as U.S. Pat. No. 7,675,885, which application claims priority to Provisional Application No. 60/526,557 entitled "CDMA/GPRS Packet Data Roaming" filed Dec. 3, 2003, and assigned to the assignee hereof and hereby expressly incorporated by reference herein.

BACKGROUND

1. Field

The present disclosed embodiments relate generally to wireless communications, and more specifically to roaming in the context of CDMA2000 and GPRS systems.

2. Background

Wireless subscribers may desire to use their wireless terminals in conjunction with wireless systems other than their home systems to obtain access to services using their existing subscriptions. Access to these services may be independent of their normal wireless terminals, through wireless systems other than their home systems. This may occur, for example, when the subscriber is roaming outside the service area of their home system. Accordingly, manufacturers and system operators desire to allow subscribers to receive services using their terminals and subscriptions via a system which may not be the subscriber's home system, provided that the terminal and the serving system are compatible.

Serving roaming subscribers can be difficult even when the serving system and home system employ identical technologies. When the serving system uses an air interface that differs from that used in the subscriber's home system, interworking between these systems is typically performed due to fundamental differences in message protocols, call models, et cetra. This interworking can be achieved via an Interworking and Interoperability Function (IIF).

One example of an IIF is described in US Patent Application 2002/094811 A1 to Bright et al. entitled "Interworking and Interoperability of GPRS Systems With Systems of Other Technology Families." US Patent Application 2002/094811 A1 provides a GPRS interworking and interoperability function (IIF) interposed between a serving GSM/GPRS wireless system and a second wireless system of a different technology family. The IIF allows a mobile station homed to the second wireless system to operate in the GSM/GPRS system. According to US Patent Application 2002/094811 A1, telecommunications system components are provided that allow interworking and interoperability of a serving GSM and/or GPRS system with certain "domestic wireless" systems. For example, a mobile station homed on such a domestic wireless system, but registered with the serving system in a GPRS-only mode, may receive services from the serving system. US Patent Application 2002/094811 A1 mentions that the term "domestic wireless" (DW) is intended to refer to non-GSM systems compatible with ANSI or equivalent standards for TDMA, CDMA, and analog cellular systems, as generally used in North America, or compatible with other similar systems.

Although US Patent Application 2002/094811 A1 acknowledges the need for an IIF allows a mobile station homed to a CDMA wireless system to operate in the GSM/GPRS system, US Patent Application 2002/094811 A1 does not discuss an IIF adapted for CDMA2000/GPRS roaming scenarios when the terminal is using Mobile IP or Simple IP. US Patent Application 2002/094811 A1 fails to provide sufficient information, direction or guidance regarding how an IIF could be constructed that would allow a mobile station homed to a CDMA2000 wireless system could operate in the GSM/GPRS system, when the terminal is using Mobile IP or Simple IP. For example, US Patent Application 2002/094811 A1 fails to provide any details regarding what modules would be needed to implement such an IIF, how the modules would be interconnected, timed and controlled so as to obtain the specific operations needed to implement such an IIF.

Thus, there is a need in the art for a general architecture can be adapted for CDMA2000/GPRS roaming scenarios, such as, GPRS foreign mode with Mobile IPv4, GPRS foreign mode with Simple IPv4 or IPv6, CDMA2000 packet data foreign mode with Mobile IPv4, and CDMA2000 packet data foreign mode with Simple IP, Mobile IPv4 or Mobile IPv6. It would be desirable to enable communication between a CDMA 2000 packet data system and a GPRS system, when a CDMA 2000 packet data native subscriber using Simple IP, Mobile IPv4 or Mobile IPv6 roams to the GPRS system by supporting bearer connectivity between the GPRS and CDMA 2000 packet data system. Similarly, it would also be desirable to enable communication between a GPRS system and a CDMA 2000 packet data system when a GPRS native subscriber roams from the GPRS system to the CDMA 2000 packet data system using Simple IP, Mobile IPv4 or Mobile IPv6 by supporting bearer connectivity between the GPRS system and the CDMA 2000 packet data system.

SUMMARY

According to one aspect of the invention, an interface entity, interposed between a CDMA 2000 packet data system and a GPRS system, is provided that enables communication between the CDMA 2000 packet data system and the GPRS system when a CDMA 2000 packet data native subscriber roams to the GPRS system by supporting bearer connectivity between the GPRS and CDMA 2000 packet data system by providing a packet routing function.

According to one aspect of the invention, an interface entity is provided that enables communication between a home CDMA 2000 packet data system and a visited GPRS system comprising a SGSN, when a CDMA 2000 packet data native subscriber using Mobile IPv4 roams to a visited GPRS system.

For example, in an embodiment where a CDMA 2000 packet data native subscriber roams to a visited system and uses Mobile IPv4, an interface entity can be provided that couples the home system to the visited system to enable communication between the home system and the visited system. In this situation, the home system is a CDMA 2000 packet data system that can include a ANSI-41 home location register; an AAA entity; and a home agent, whereas the visited system can be a GPRS system that includes a SGSN.

According to one aspect of this embodiment, the interface comprises a GSM home location register emulation module, and an ANSI-41 visited location register emulation module. The GSM home location register emulation module can be coupled to the SGSN via a Gr interface, that allows a subscriber to register over a Gr interface, whereas the ANSI-41 visited location register emulation module can be coupled to the ANSI-41 home location register via a D interface that allows a subscriber to register over the D interface. According to one aspect of this embodiment, the interface further comprises a foreign agent emulation module and a GGSN emulation module. The foreign agent emulation module can be coupled to the home agent via an X1 interface, and supports bearer connectivity between the visited system and the home system such that a foreign agent interface and an AAA interface are presented to the CDMA 2000 packet data system over the X1 interface. The GGSN emulation module can be coupled to the SGSN via a Gp interface, and can support bearer connectivity between the visited system and the home system such that a GGSN interface is presented to the visited system over the Gp interface. The interface can serve as an endpoint for a GTP tunnel and a Mobile IP tunnel. In this embodiment, the interface provides a packet routing function between the GGSN interface and the foreign agent interface. According to another aspect of this embodiment, the interface can also include an AAA emulation module that can be coupled to the AAA entity via an X3 interface. In this embodiment, the AAA emulation module provides an accounting function to interacting with a home network's AAA for Mobile IP Foreign Agent challenge authentication and 3GPP2 packet data accounting.

According to one aspect of the invention, an interface entity is provided that enables communication between a home CDMA 2000 packet data system and a visited GPRS system comprising a SGSN, when a CDMA 2000 packet data native subscriber using Simple IP roams to a visited GPRS system.

In an embodiment where a CDMA 2000 packet data native subscriber roams to a visited system and uses Simple IP, an interface entity can be provided that couples the home system to the visited system to enable communication between the home system and the visited system. In this situation, the home system is a CDMA 2000 packet data system that can include a ANSI-41 home location register; an AAA entity; and a LNS, whereas the visited system can be a GPRS system that includes a SGSN.

According to one aspect of this embodiment, the interface comprises an ANSI-41 visited location register, and a GSM home location register. The ANSI-41 visited location register can be coupled to the ANSI-41 home location register via a D interface, and allows a subscriber to register over the D interface. The GSM home location register can be coupled to the SGSN via a Gr interface and allows a subscriber to register over the Gr interface. According to another aspect of this embodiment, the interface may comprise a LAC emulation module and a GGSN emulation module. The LAC emulation module can be coupled to the LNS via an X2 interface, and supports bearer connectivity between the visited and home networks over the X2 interface. The GGSN emulation module can be coupled to the SGSN via a Gp interface, and supports bearer connectivity between the visited and home networks over the Gp interface by presenting a GGSN interface to the visited system and presenting a normal routing interface to the CDMA 2000 packet data system to thereby provide a packet routing function between the GGSN interface and the home system. In this case, the interface serves as an endpoint for a GTP tunnel and an IPSec tunnel. According to yet another aspect of this embodiment, the interface can include an AAA emulation module that can be coupled to the AAA entity via an X3 interface. The AAA emulation module can provide an accounting function by interacting with the home network's AAA for L2TP authentication and 3GPP2 packet data accounting over the X3 interface.

According to another aspect of the invention, an interface entity, interposed between a GPRS system to a CDMA 2000 packet data system, is provided that enables communication between the GPRS system and the CDMA 2000 packet data system when a GPRS native subscriber roams from the GPRS system to a CDMA 2000 packet data system using one of Mobile IPv4 and Simple IP by supporting bearer connectivity between the GPRS system and the CDMA 2000 packet data system by providing a packet routing function.

According to yet another aspect of the invention, an interface entity is provided that enables communication between a home GPRS system comprising a GSM home location register, a GGSN, and an AAA entity, and a visited CDMA 2000 packet data system that comprises an ANSI-41 visited location register, an AAA entity, and a packet data serving node/foreign agent, when a GPRS native subscriber using Mobile IPv4 roams to the visited CDMA 2000 packet data system.

In an embodiment where a GPRS native subscriber roams to a visited system and uses Mobile IPv4, an interface entity can be provided that couples the home system to the visited system to enable communication between the home system and the visited system. In this situation, the home system is a GPRS system comprising a GSM home location register; a GGSN; and an AAA entity, whereas the visited system can comprise a CDMA 2000 packet data system that includes a ANSI-41 visited location register; a AAA entity; and a packet data serving node/foreign agent.

According to one aspect of this embodiment, the interface comprises a home agent emulation module and a SGSN emulation module. The home agent emulation module can be coupled to the packet data serving node/foreign agent via an X1 interface, and presents a home agent interface to the visited system. The SGSN emulation module can be coupled to the GGSN via a Gp interface, and presents a SGSN interface to the home system to support bearer connectivity between the visited and home networks by providing a packet routing function between the SGSN interface and the home agent interface. Here, the interface serves as an endpoint for a GTP tunnel and a Mobile IP tunnel. According to another aspect of this embodiment, the interface can also include an ANSI-41 home location register emulation module, and a GSM visited location register emulation module. The ANSI-41 home location register emulation module can be coupled to the ANSI-41 visited location register via a D interface, whereas the GSM visited location register emulation module can be coupled to the GSM home location register via a D interface, to allow a subscriber to register. According to yet another aspect of this embodiment, the interface may also include an AAA emulation module that can be coupled to the AAA entity via a Gi interface and coupled to the AAA entity via a X3 interface. The AAA emulation module interacts with the visited network's AAA for Mobile IP authentication and 3GPP2 packet data accounting, over the X3 interface, and the home network's AAA for 3GPP packet data accounting, over the Gi interface.

According to one aspect of the invention, an interface entity is provided that enables communication between a home GPRS system comprising a GSM home location register, a GGSN, and an AAA entity, and a visited CDMA 2000 packet data system that comprises an ANSI-41 visited location register, an AAA entity, and a packet data serving node/ LAC entity, when a GPRS native subscriber using Simple IP roams to the visited CDMA 2000 packet data system.

In an embodiment where a GPRS native subscriber roams to a visited system and uses Simple IP, an interface entity can be provided that couples the home system to the visited system to enable communication between the home system and the visited system. In this situation, the home system is a GPRS system comprising a GSM home location register; a GGSN; and an AAA entity, whereas the visited system can comprise a CDMA 2000 packet data system that includes a ANSI-41 visited location register; a AAA entity; and a packet data serving node/LAC entity. According to one aspect of the invention, the interface supports bearer connectivity between the visited and home networks by providing a packet routing function. For example, the interface can include a SGSN emulation module, and a LNS emulation module. The SGSN emulation module can be coupled to the GGSN over a Gp interface, and presents a SGSN interface to the home system, whereas the LNS emulation module can be coupled to the packet data serving node/LAC entity over an X2 interface, and presents a L2TP Network Server (LNS) interface to the visited system. As such, this interface provides the packet routing function between the SGSN emulation module and the LNS emulation module. Here, the interface serves as an endpoint for a GTP tunnel and a Mobile L2TP tunnel.

According to another aspect of this embodiment, the interface comprises a ANSI-41 home location register emulation module and a GSM visited location register emulation module. The ANSI-41 home location register emulation module can be coupled to the ANSI-41 visited location register via a D interface, whereas the GSM visited location register emulation module can be coupled to the GSM home location register via another D interface. This allows a subscriber to register. According to yet another aspect of this embodiment, the interface may also include an AAA emulation module that can be coupled to the AAA entity via a Y3 interface and coupled to the AAA entity via a X3 interface. The AAA emulation module interacts with the visited network's AAA entity, over an X3 interface, for L2TP authentication and 3GPP2 packet data accounting, and with the home network's AAA entity, over an Gi interface, for 3GPP packet data accounting.

BRIEF DESCRIPTION OF THE DRAWINGS

FIG. 3A is a block diagram of GPRS foreign mode with Simple IP;

FIG. 5B is a call flow diagram that shows Simple IP operation in the CDMA2000 packet data foreign mode.

DETAILED DESCRIPTION

The word "exemplary" can be used herein to mean "serving as an example, instance, or illustration." Any embodiment described herein as "exemplary" can be not necessarily to be construed as preferred or advantageous over other embodiments.

Figure 1:
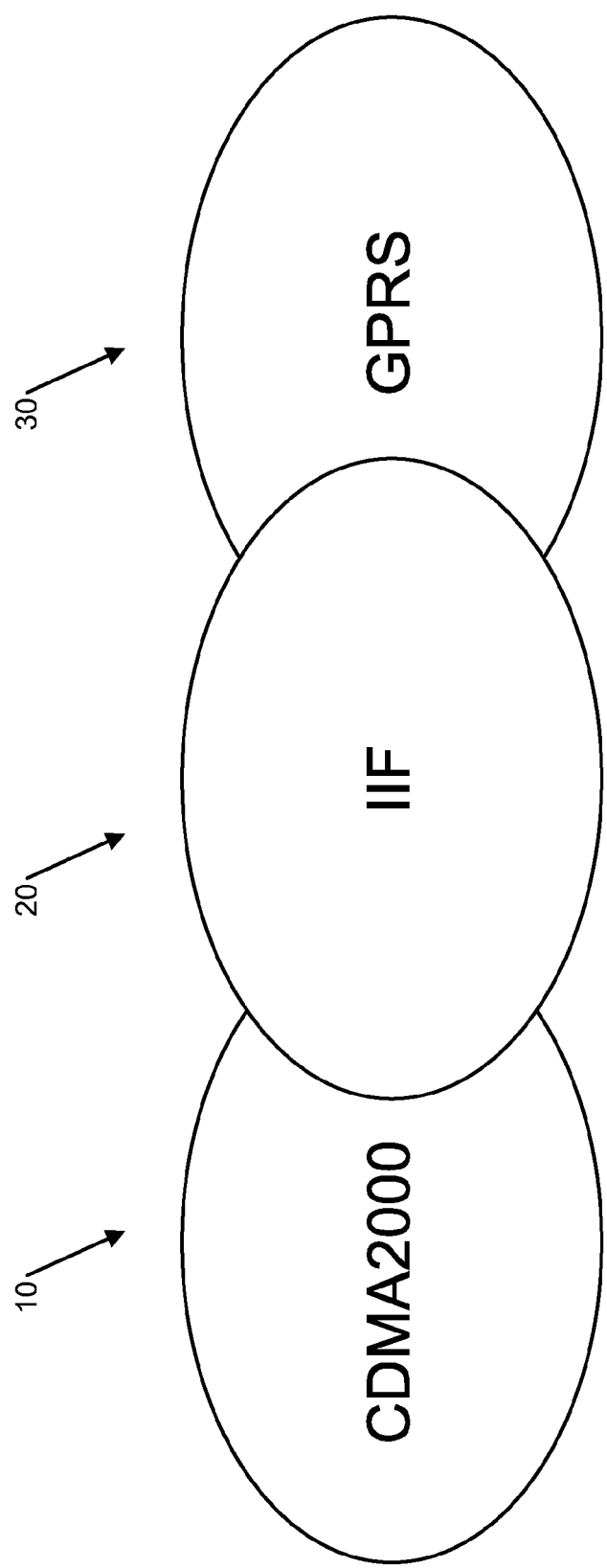
FIG. 1 is a block diagram of a system that comprises a home system, a visited system, and an interface entity that enables communication between the home system and the visited system.

FIG. 1 is a block diagram of a system that comprises a home system 10, such as a CDMA 2000 packet data system or a GPRS system, a visited system 20, such as a GPRS system or a CDMA 2000 packet data system, and an interface entity 30 or "IIF" that couples the home system 10 to the visited system 20, and enables communication between the home system 10 and the visited system 20.

The following sections describe architectures that can be adapted for CDMA2000/GPRS roaming scenarios, such as, GPRS foreign mode with Mobile IPv4, GPRS foreign mode with Simple IPv4 or IPv6, CDMA2000 packet data foreign mode with Mobile IPv4, and CDMA2000 packet data foreign mode with Simple IPv4 or IPv6.

GPRS Foreign Mode with Mobile IPv4

Figure 2A:
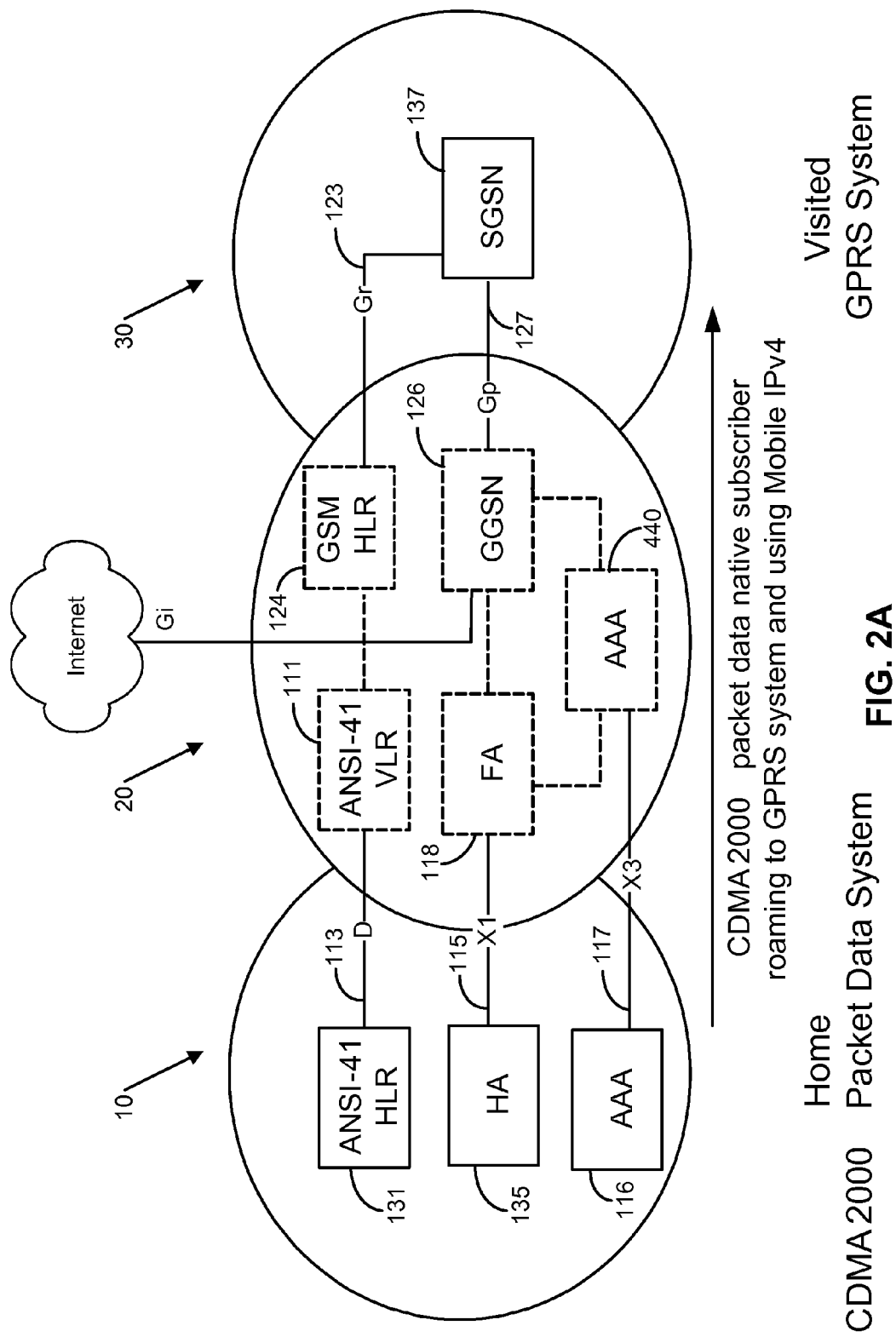
FIG. 2A is a block diagram of GPRS foreign mode with Mobile IPv4.

FIG. 2A is an exemplary block diagram of a GPRS foreign mode with Mobile IPv4, and depicts the functions and control interface provided by an IIF in this embodiment. This roaming scenario occurs when a CDMA2000 packet data native subscriber operates Mobile IPv4 [IS-835-C] in GPRS foreign mode. In this embodiment, the home system 10 can be a CDMA 2000 packet data system wherein a CDMA 2000 packet data native subscriber roams to a GPRS system and uses Mobile IPv4. The home system 10 comprises a ANSI-41 home location register 131, an AAA entity 116, and a home agent 135. The visited system 20 can be a GPRS system that comprises a SGSN 137.

The interface 30 or "IIF" comprises an ANSI-41 visited location register 111 coupled to the ANSI-41 home location register 131 via a D interface 113, a GSM home location register 124 coupled to the SGSN 137 via a Gr interface 123, a GGSN 126 coupled to the SGSN 137 via a Gp interface 127 and coupled to the Internet via a Gi interface, an AAA entity 140 coupled to the AAA entity 116 via an X3 interface 117, and a foreign agent 118 coupled to the home agent 135 via an X1 interface 115. The IIF provides both GSM HLR and ANSI-41 VLR emulation to allow the subscriber to register. This interworking can be provided over the interface references "Gr" and "D". The IIF provides GGSN and FA emulation to support bearer connectivity between the visited and home networks via the IIF. This interworking can be provided over the interface references "Gn" and "X1". The IIF provides AAA emulation to interact with the home network's AAA for Mobile IP Foreign Agent challenge authentication and 3GPP2 packet data accounting. This interworking can be provided over the interface reference "X3".

If bearer connectivity between from the GPRS system and the CDMA2000 packet data system is not required, then reverse tunneling on the X1 interface is not required. Rather, MS-terminated traffic traverses through the X1 and Gp interfaces. In the case where reverse tunneling is not required, the IIF routes MS-originated traffic, received on a Gp interface, to the Internet directly via a Gi interface.

Thus, for a user homed in a CDMA Mobile IP system roaming to a GSM system, the IIF may present a GGSN interface to GSM and a FA and AAA interfaces to the CDMA system. The IIF may serve as the endpoint for the GTP and Mobile IP tunnels, with a packet routing function between the GGSN and FA. The IIF may also provide an accounting function so that operators can charge based on configurable measurements such as packet count, bandwidth, time of day, etc.

Figure 2B:
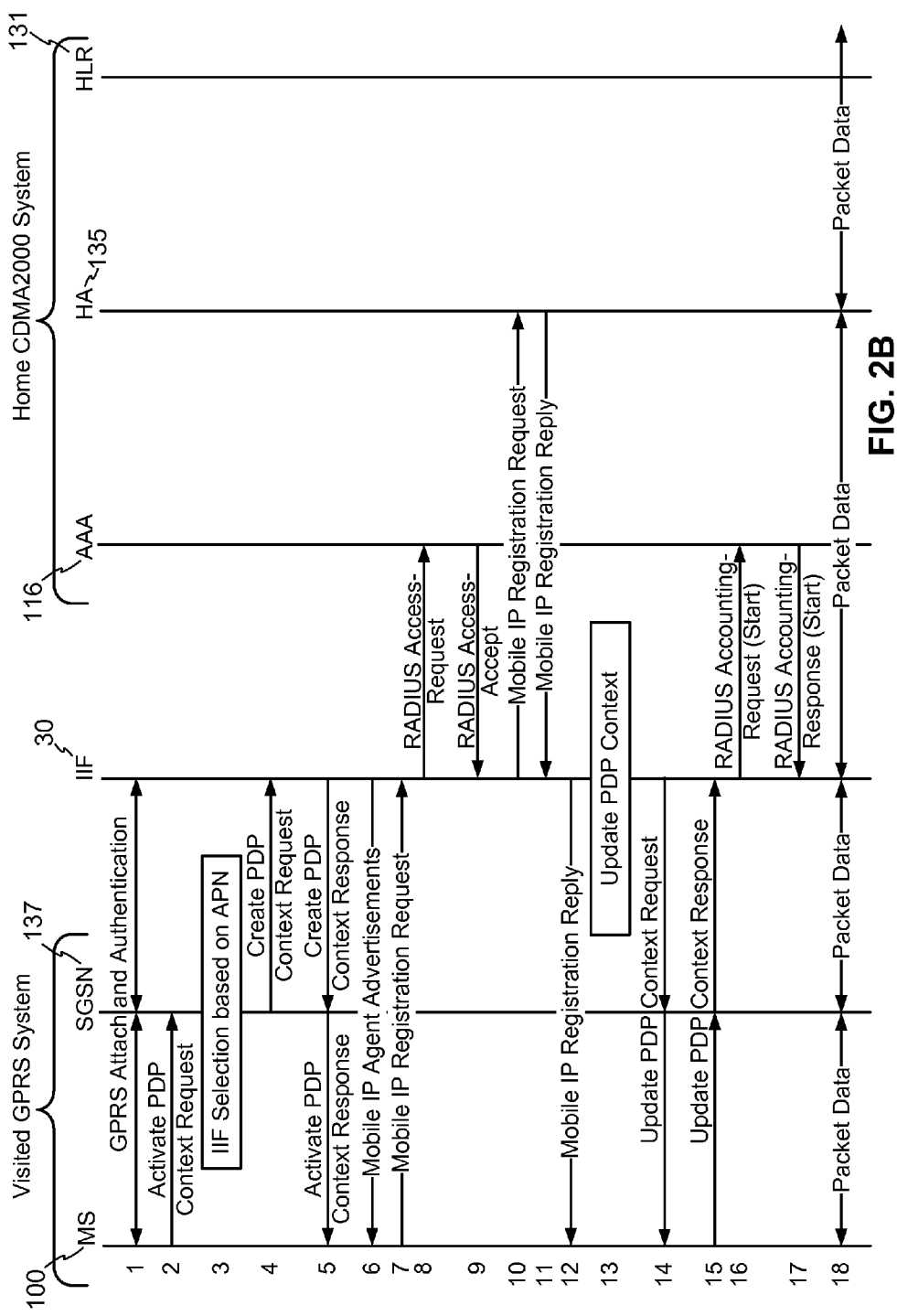
FIG. 2B is a call flow diagram that shows Mobile IPv4 operation in the GPRS foreign mode.

FIG. 2B is an exemplary call flow diagram that shows Mobile IPv4 operation in the GPRS foreign mode. FIG. 2B depicts a call flow example for the roaming scenario where a CDMA2000 packet data native subscriber operates Mobile IPv4 [IS-835-C] in the GPRS foreign mode. In this example, the MS has shared secrets with the home CDMA2000 system for Mobile IP authentication. The MS may request the home CDMA2000 system to assign a HA and/or an IP address. The reverse tunneling can be enabled so that all data traffic (MS-originated and terminated) traverses through the IIF and home CDMA2000 system. The IIF generates 3GPP2 packet data accounting records and sends it to the home CDMA2000 system via RADIUS.

The MS performs GPRS attach with a SGSN. The authentication associated with the GPRS attach can be a SIM-based authentication requiring the Ki secret key. The IIF acts as the GSM HLR configured with the Ki secret. In any case, the IIF can be not required to communicate with the HLR in the home CDMA2000 system for the authentication. (Step 1) The MS sends the Activate PDP Context Request to the SGSN. The message includes the Access Point Name (APN). The APN has the format <Network ID>.<MNC>.<MCC>.gprs. The Network ID (e.g., CDMA2000carrier.com) indicates to which external network the MS wants to establish a logical connection. The Requested PDP Address can be omitted in the message. The MS has a static Mobile IP home address or obtains a new Mobile IP home address. (Step 2) The SGSN selects a GGSN based on the APN. The SGSN uses the APN as the lookup name to query a DNS server (not shown in the figure) and obtains a list of available GGSNs that can be used to support the requested APN. The APN's Network ID indicates a CDMA2000 operator; thus, the DNS server returns with the IIF's IP address. (Step 3) The SGSN sends the Activate PDP Context Request to the selected IIF to set up a PDP context for the MS. The message includes the APN, but the Requested PDP Address can be omitted. (Step 4) The IIF acts as the GGSN and sends the Create PDP Context Response to the SGSN that in turn sends the Activate PDP Context Accept to the MS. The PDP Address in both messages can be set to 0.0.0.0 to indicate that the PDP address will be assigned later after successful Mobile IP registration. (Step 5) The IIF acts as the FA and sends one or more Mobile IP Agent Advertisements to the MS, because the omission of the Requested PDP Address in the Activate PDP Context Request can be the indication that the MS wishes to use Mobile IP. The Agent Advertisement can be sent over the established PDP context. The Agent Advertisement contains the FA Care-of Address and the FA Challenge (FAC). (Step 6)

The MS sends the Mobile IP Registration Request to the IIF over the PDP context. The following information can be contained in the Registration Request: MS's NAI [RFC 2794] has the format of <username>@<domain name>, where the domain name identifies the MS's home CDMA2000 system. MS-HA authenticator can be computed based on the content of the Registration Request and the secret shared between the MS and HA [RFC 2002]. MS-AAA authenticator can be computed based on the FAC and the secret shared between the MS and home AAA server [RFC 3012]. The HA Address field can be set to a known value if the MS uses a permanent HA, or to 0.0.0.0 if the MS wants a new HA assigned by the home network. Home Address field can be set to a known value if the MS uses a permanent address, or to 0.0.0.0 if the MS wants a new address assigned by the HA. The T-bit can be set to one to enable a reverse tunnel from the IIF to the MS's HA. (Step 7) The IIF acts as the RADIUS client and sends a RADIUS Access-Request to the home AAA server. The RADIUS Access-Request conveys MS's NAI, FAC authenticator, FAC, HA address, etc. [IS-835]. (Step 8) If the authentication is successful, the home AAA server responds with the RADIUS Access-Accept that includes the MS's HA address. (Step 9) The IIF acts as the FA and forwards the Mobile IP Registration Request to the HA address contained in the RADIUS Access-Accept. (Step 10) The HA verifies the MS-HA authenticator in the Mobile IP Registration Request. If the HA doesn't have the shared secret, as in the case of dynamically assigned HA, it communicates with the home AAA server for the shared secret. The HA responds to the Mobile IP Registration Request with the Mobile IP Registration Reply containing a registration result (e.g., successful or an error code). If the MS wishes for a new home address, a new address can be returned in the Registration Reply; otherwise, the MS's permanent address can be returned. (Step 11) The IIF acts as the FA and forwards the Mobile IP Registration Reply to the MS over the appropriate PDP context. The IIF FA functionality notes the assigned MS IP address and shares that address with the IIF GGSN functionality. (Step 12)

The IIF acts as the GGSN and updates its PDP context by setting the PDP address to the MS's home address (as indicated in the Registration Reply and shared by the FA functionality). The PDP address (hence the MS's home address) can be associated with a GTP tunnel identified by the Tunnel Endpoint ID (TEID). (Step 13) The IIF acts as the GGSN and triggers the GGSN-initiated PDP Context modification procedure in order to update the PDP address in the SGSN and MS [3GPP TS 29.061]. The IIF sends the Update PDP Context Request to the SGSN that forwards it to the MS. (Step 14) The MS responds with the Update PDP Context Response to the SGSN that forwards it to the IIF. (Step 15) The IIF acts as the RADIUS client and sends the RADIUS Accounting-Request (Start) to the home AAA server [IS-835]. 3GPP2-vendor-specific attributes are used to convey accounting records, but some airlink record attributes (e.g., service option, mux option, etc.) are not applicable. (Step 16) The home AAA server responds with a RADIUS Accounting-Response (Start). (Step 17) Bearer traffic traverses through the IIF in both directions, if reverse tunneling from the IIF to HA is enabled. For routing MS-originated packets, the IIF routes packets received from the MS's GTP tunnel (identified by a TEID) to the MS's HA via a Mobile IP reverse tunnel. For routing MS-terminated packets, the IIF routes packets received from the HA-to-FA tunnel to the MS's GTP tunnel. IPsec can be used to protect the Mobile IP tunnels between HA and IIF, and the GTP tunnels between IIF and SGSN. (Step 18)

GPRS Foreign Mode with Simple IP

FIG. 3A is an exemplary block diagram of a GPRS foreign mode with Simple IP that shows a roaming scenario where a CDMA2000 packet data native subscriber operates IPv4 or IPv6 in the GPRS foreign mode. FIG. 3A also depicts the functions and control interface provided by an interface or IIF in this case. In this embodiment, the home system 10 can be a CDMA 2000 packet data system wherein a CDMA 2000 packet data native subscriber roams to a GPRS system and uses Simple IP. The home system 10 comprises a ANSI-41 home location register 131, an AAA entity 116, and a LNS 139. The visited system 20 can be a GPRS system that comprises a SGSN 137.

The interface 30 or "IIF" comprises an ANSI-41 visited location register 111 coupled to the ANSI-41 home location register 131 via a D interface 113, a GSM home location register 124 coupled to the SGSN 137 via a Gr interface 123, a GGSN 126 coupled to the SGSN 137 via a Gp interface 127 and coupled to the Internet via a Gi interface, an AAA entity 140 coupled to the AAA entity 116 via an X3 interface 117, and a LAC entity 109 coupled to the LNS 139 via an X2 interface 119. The IIF provides both GSM HLR and ANSI-41 VLR emulation to allow the subscriber to register. This interworking can be provided over the interface references "Gr" and "D." The IIF provides GGSN and LAC emulation to support bearer connectivity between the visited and home networks via the IIF. This interworking can be provided over the interface references "Gn" and "X2." The IIF provides AAA emulation to interact with the home network's AAA for L2TP authentication and 3GPP2 packet data accounting. This interworking can be provided over the interface reference "X3."

If bearer connectivity between the CDMA2000 packet data system and GPRS system is not required, then the X2 interface is not required. The IIF still supports a Gp interface to the SGSN and provides Internet access via a Gi interface (not shown in the figure).

Thus, for a user homed in a CDMA Simple IP system roaming to a GSM system, the IIF may present a GGSN interface to GSM and a normal routing interface to the CDMA system. The IIF may serve as the endpoint for the GTP and IPSec tunnels, with a packet routing function between the GGSN and the CDMA system. The IIF may also provide an accounting function so that operators can charge based on configurable measurements such as packet count, bandwidth, time of day, etc.

Figure 3B:
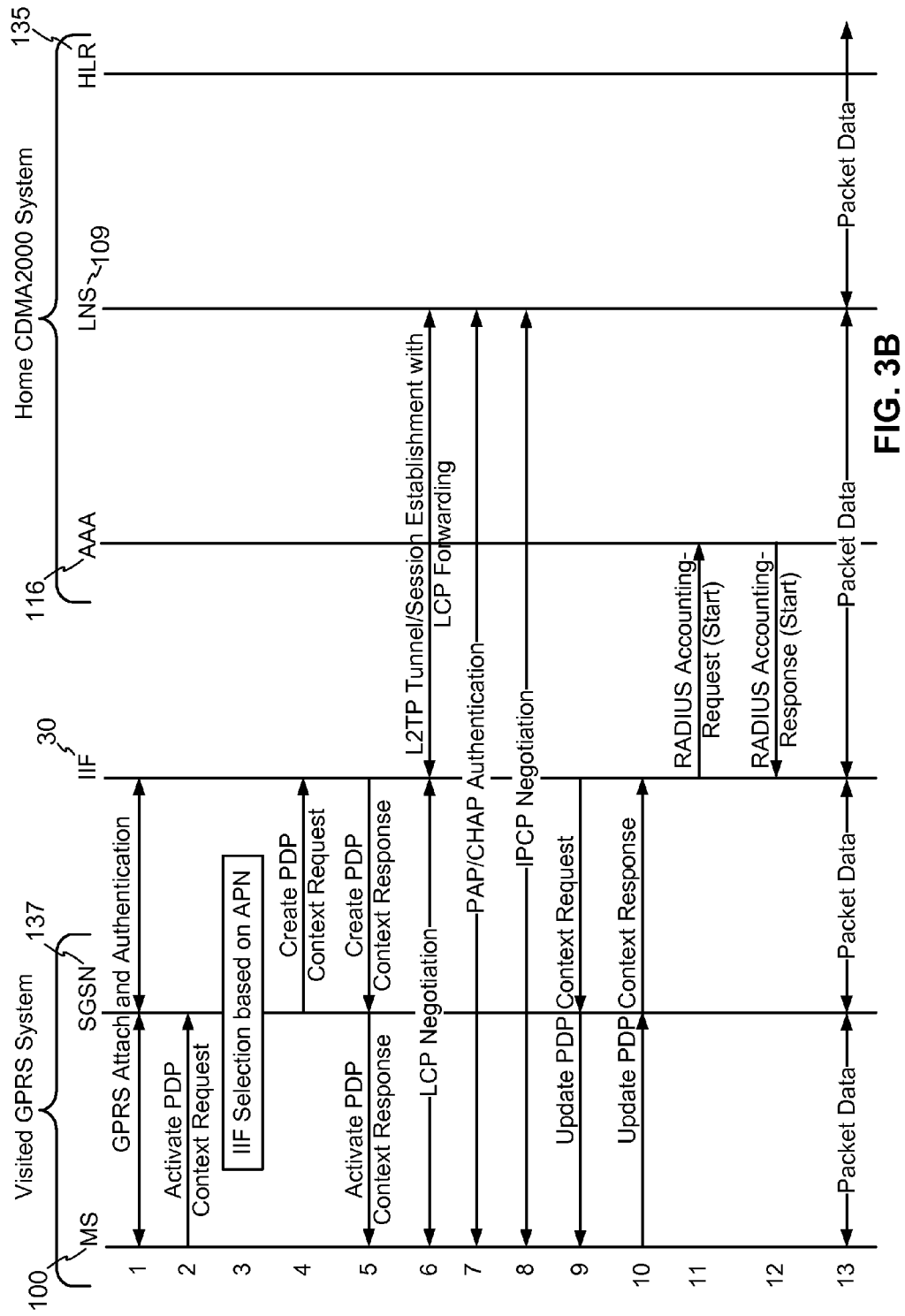
FIG. 3B is a call flow diagram that shows Simple IP operation in the GPRS foreign mode.

FIG. 3B is an exemplary call flow diagram that shows Simple IP operation in the GPRS foreign mode, and explains a roaming scenario where a CDMA2000 packet data native subscriber operates Simple IP in the GPRS foreign mode. In this example, the MS has shared secrets with the home CDMA2000 system for Simple IP authentication (i.e., CHAP). The MS establishes a PPP session, via L2TP, to the home CDMA2000 system. During the PPP establishment, the home CDMA2000 system assigns an IP address to the MS dynamically. All the MS's data traffic (MS-originated and— MS terminated) traverses through the IIF and home CDMA2000 system. The IIF generates 3GPP2 packet data accounting records and sends it to the home CDMA2000 system via RADIUS.

The MS performs GPRS attach with a SGSN. The authentication associated with the GPRS attach can be a SIM-based authentication requiring the Ki secret. The IIF acts as the GSM HLR configured with the Ki secret or the GSM VLR. In any case, the IIF can be not required to communicate with the HLR in the home CDMA2000 system for the authentication. (Step 1) The MS sends the Activate PDP Context Request to the SGSN. The message includes the APN (Access Point Name). The APN has the format <Network ID>.<MNC>.<MCC>.gprs. The Network ID (e.g., CDMA2000carrier.com) indicates to which external network the MS wants to establish a logical connection. The Requested PDP Address can be omitted in the message so that the IIF (acting as a GGSN) later will not assign an IP address to the MS; instead, the address will be assigned by the LNS. (Step 2) The SGSN selects a GGSN based on the APN. The SGSN queries a DNS server (not shown in the figure) and obtains a list of available GGSNs that can be used to support the requested APN. In this case, the APN's Network ID indicates a CDMA2000 operator; thus, the DNS server returns with the IIF's IP address. (Step 3)

The SGSN sends the Activate PDP Context Request to the selected IIF to set up a PDP context for the MS. The message includes the APN, but the Requested PDP Address can be omitted. (Step 4) The IIF acts as the GGSN and sends the Create PDP Context Response to the SGSN that in turn sends the Activate PDP Context Accept to the MS. The PDP Address in both messages can be set to 0.0.0.0 to indicate that the PDP address will be reset later. (Step 5)

After the PDP context can be established, the MS and IIF perform PPP LCP negotiation. The IIF LAC functionality establishes L2TP tunnels with a LNS. The IIF determines which LNS based on the requested APN. The IIF is configured with the LNS information (e.g., LNS's IP address) corresponding to an APN. After the L2TP tunnel establishment, the IIF LAC functionality forwards LCP information between the LNS and MS. During the LCP negotiation, the LNS and MS negotiate PAP or CHAP as the protocol for PPP authentication. (Step 6) PPP authentication (PAP or CHAP) is performed. The MS's credential is authenticated by the home AAA in the CDMA2000 system. The RADIUS interaction between the LNS and home AAA is not shown in the figure. (Step 7) The LNS and MS perform PPP IPCP negotiation. The IIF LAC functionality relays IPCP messages between the L2TP tunnel and PDP context. During the negotiation, the LNS assigns an IP address to the MS. The IIF monitors for this address and uses it as the MS's PDP address. (Step 8)

The IIF also needs to notify the SGSN and MS about the updated PDP address. Recall that the PDP address can be set to 0.0.0.0 initially. Therefore, the IIF sends the Update PDP Context Request to the SGSN that forwards it to the MS. (Step 9) The MS responds with the Update PDP Context Response to the SGSN that forwards it to the IIF. (Step 10)

The IIF acts as the RADIUS client and sends the RADIUS Accounting-Request (Start) to the home AAA server [IS-835]. 3GPP2-vendor-specific attributes are used to convey accounting records, but some airlink record attributes (e.g., service option, mux option, etc.) are not applicable. (Step 11) The home AAA server responds with the RADIUS Accounting-Response (Start). (Step 12) Bearer traffic traverses through the IIF in both directions. For routing MS-originated packets, the IIF routes packets received from the MS's GTP tunnel (identified by a TEID) to the MS's L2TP tunnel/session. For routing MS-terminated packets, the IIF routes packets received from the MS's L2TP tunnel/session to the MS's GTP tunnel. IPsec can be used to protect the L2TP tunnel/session between LNS and IIF, and the GTP tunnels between IIF and SGSN. (Step 13)

CDMA2000 Packet Data Foreign Mode with Mobile IPv4

Figure 4A:
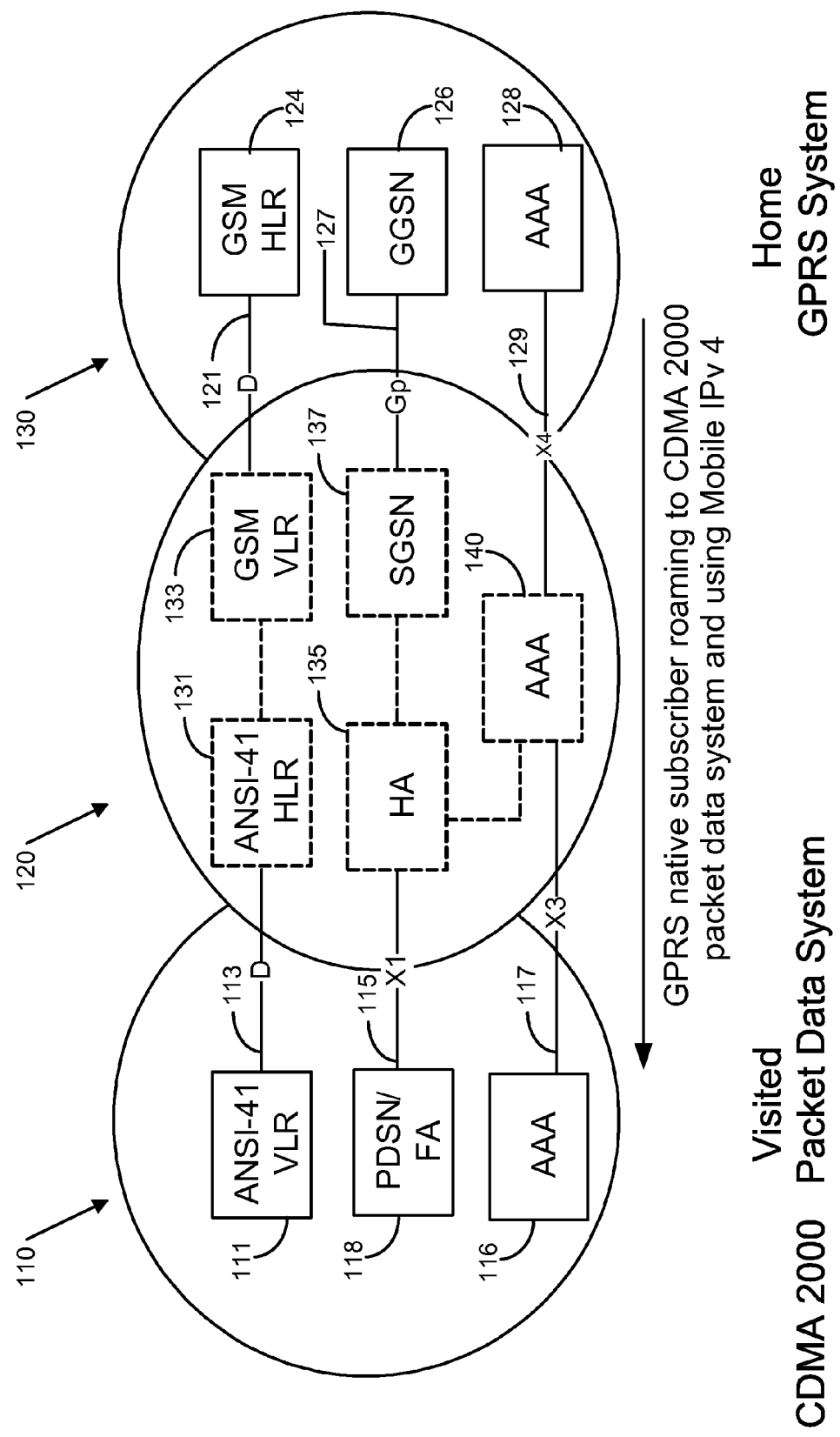
FIG. 4A is a block diagram of CDMA2000 packet data foreign mode with Mobile IPv4.

FIG. 4A is an exemplary block diagram of a CDMA2000 packet data foreign mode with Mobile IPv4. This section describes the roaming scenario where a GPRS native subscriber operates Mobile IPv4 [IS-835-C] in the CDMA2000 packet data foreign mode. FIG. 4A also depicts the functions and control interface provided by the IIF in this case. In this embodiment, the home system 10 can be a GPRS system. A GPRS native subscriber roams to a CDMA 2000 packet data system and uses Simple IP. The home system 10 comprises a GSM home location register 124, a GGSN 126, and an AAA entity 128. The visited system 20 can be a CDMA 2000 packet data system that comprises a ANSI-41 visited location register 111, an AAA entity 116, and a packet data serving node/foreign agent 118.

The interface 30 or "IIF" comprises an ANSI-41 home location register 131 coupled to the ANSI-41 visited location register 111 via a D interface 113, a GSM visited location register 133 coupled to the GSM home location register 124 via a D interface 121, a SGSN 137 coupled to the GGSN 126 via a Gp interface 127, an AAA entity 140 coupled to the AAA entity 128 via a X4 interface 129 and coupled to the AAA entity 116 via a X3 interface 117, and a home agent 135 coupled to the packet data serving node/foreign agent 118 via a X1 interface 115. The IIF provides both GSM VLR and ANSI-41 HLR emulation to allow the subscriber to register. This interworking can be provided over the interface reference "D". The IIF provides HA and SGSN emulation to support bearer connectivity between the visited and home networks via the IIF. This interworking can be provided over the interface reference "X1" and "Gn". The IIF provides AAA emulation to interact with the visited network's AAA for Mobile IP authentication and 3GPP2 packet data accounting. The IIF also may interact with the home network's AAA for 3GPP packet data accounting. This interworking can be provided over the interface reference "X3" and "X4". The IIF/AAA requirements for CDMA2000 packet data foreign mode with mobile IP will be described below in greater detail.

If bearer connectivity between the visited CDMA2000 packet data system and home GPRS system is not required, the Gp interface is not required. In this case, mobile-originated data traffic can be routed directly to the Internet via the PDSN/FA in the visited system, or via the IIF/HA if reverse tunneling is enabled. Mobile-terminated data traffic is routed to the PDSN/FA via the IIF/HA. The interface X3 and X4 are required for the IIF to interwork AAA messages between the CDMA2000 AAA server and GPRS AAA server.

Thus, for a user homed in a GSM system roaming to a CDMA Mobile IP system, the IIF may present a HA interface to the CDMA system and a SGSN interface to the GSM system. A subset of SGSN functions is required including APN resolution. The IIF may serve as the endpoint for the Mobile IP and GTP tunnels, with a packet routing function between the HA and SGSN functions.

Figure 4B:
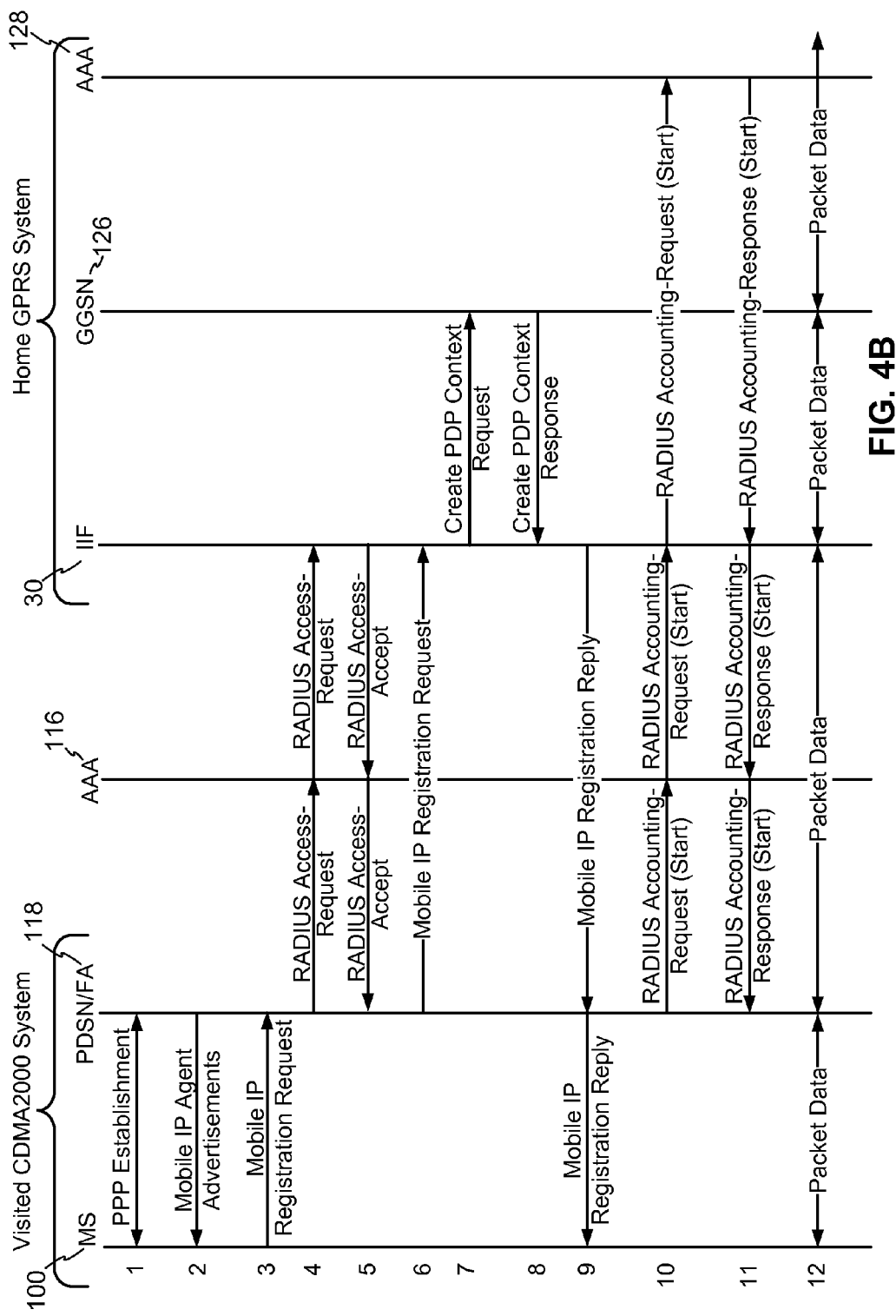
FIG. 4B is a call flow diagram that shows Mobile IPv4 operation in the CDMA2000 packet data foreign mode.

FIG. 4B is an exemplary call flow diagram that shows Mobile IPv4 operation in the CDMA2000 packet data foreign mode. This call flow example shows a roaming scenario where a GPRS native subscriber operates Mobile IPv4 [IS-835-C] in the CDMA2000 packet data foreign mode. In this example, the home GPRS system doesn't support HA; thus, the MS has shared secrets with the IIF for Mobile IP authentication. The home GPRS system dynamically assigns an IP address to the MS. All MS's data traffic (MS-originated and MS-terminated) traverses through the IIF and home GPRS system. The IIF receives 3GPP2 accounting records from the visited CDMA2000 system and may map them to 3GPP accounting records and forward them to the home GPRS system via RADIUS.

The MS originates SO 33 and establishes a PPP session with the PDSN/FA. (Step 1) The PDSN/FA sends one or more Mobile IP Agent Advertisements to the MS, because the omission of the IP-Address Configuration Option during the PPP IPCP negotiation indicates that the MS wishes to use Mobile IP. The Agent Advertisement contains the FA Care-of Address and the FA Challenge (FAC). (Step 2)

The MS sends the Mobile IP Registration Request to the PDSN/FA. The following information can be contained in the Registration Request: MS's NAI [RFC 2794] has the format of <username>@<domain name>, where the domain name identifies the MS's home GPRS system. MS-HA authenticator can be computed based on the content of the Registration Request and the secret shared between the MS and HA [RFC 2002]. MS-AAA authenticator can be computed based on the FAC and the secret shared between the MS and home AAA server [RFC 3012]. The HA Address field can be set to a known value if the MS uses a permanent HA, or to 0.0.0.0 if the MS wants a new HA assigned by the home network. The HA field can be set to 0.0.0.0 to request a new address assigned by the HA. The T-bit can be set to one to request the PDSN/FA to establish a reverse tunnel to the MS's HA. (Step 3)

The PDSN/FA generates a RADIUS Access-Request conveying MS's NAI, FAC authenticator, FAC, HA address, etc. [IS-835]. Because the domain name of the MS's NAI indicates a GPRS system, the PDSN/FA sends a RADIUS Access-Request to the IIF via the AAA in the CDMA2000 system. The IIF may modify the message in accordance with [3GPP TS 29.061]. (Step 4) If the authentication is successful, the home AAA server responds with the RADIUS Access-Accept. The message is routed back to the PDSN via IIF and visited AAA. The IIF may modify the message in accordance with [P.S0001-A V3.0]. (Step 5) The PDSN/FA forwards the Mobile IP Registration Request to the HA function in the IIF. The IIF verifies the MS-HA authenticator in the Mobile IP Registration Request. (Step 6)

If the authentication is successful, the IIF SGSN functionality establishes GTP tunnels with a GGSN in the home GPRS system and can request an IP address from the GGSN. The IIF SGSN functionality derives an APN that has the format <Network ID>.mnc<MNC>.mcc<MCC>.gprs [TS 23.003]. The <Network ID> is the realm portion of the MS's NAI and indicates which GGSN the MS wants to access for the requested service. The <MNC> and <MCC> are derived from the MS's IMSI. The MS's NAI and IMSI are available from the RADIUS Access-Request in step 4. The SGSN functionality uses the derived APN as the lookup name to query GPRS DNS server (not shown in the figure) and from it obtains a list of available GGSNs that can be used to support the requested service. The IIF SGSN functionality sends the Create PDP Context Request to the selected GGSN. The Requested PDP Address in the message is set to 0.0.0.0 to request a new IP address. (Step 7) The GGSN responds with the Create PDP Context Response including the new IP address assigned to the MS. (Step 8) The IIF acts as the HA and sends the Mobile IP Registration Reply to the MS via the PDSN/FA. The Home Address field in the Mobile IP Registration Reply can be set to the IP address assigned by the GGSN. (Step 9) The PDSN sends the RADIUS Accounting-Request (Start) containing 3GPP2 packet data accounting information [P.S0001-A V3.0]. Because the domain name of the MS's NAI indicates a GPRS system, the RADIUS Accounting-Request (Start) is routed to the home AAA in the GPRS system via the visited AAA and IIF. The IIF may modify the message in accordance with [3GPP TS 29.061]. (Step 10) The IIF acts as the RADIUS server and replies with the RADIUS Accounting-Response (Start). (Step 11)

Bearer traffic traverses through the IIF in both directions. For routing MS-originated packets, the IIF routes packets received from the Mobile IP reverse tunnel to the MS's GTP tunnel (identified by a TEID). For routing MS-terminated packets, the IIF routes packets received from the GTP tunnel to a HA-to-FA tunnel. IPsec can be used to protect the Mobile IP tunnels between PDSN/FA and IIF, and the GTP tunnels between IIF and GGSN. (Step 12)

IIF/AAA REQUIREMENTS for CDMA2000 Packet Data Foreign Mode with Mobile IP

The IIF requirements to process the RADIUS Access-Request received from the visited CDMA2000 packet data system will now be described.

The IIF proxies all IETF RADIUS attributes without modification, except the Calling-Station-ID attribute, Called-Station-ID attribute, and Framed-Protocol attribute. The processing of these three attributes is described below. If the Calling-Station-ID attribute in the received RADIUS Access-Request contains IMSI, the IIF copies the IMSI into the 3GPP-IMSI attribute [3GPP TS 29.061] and include it in the RADIUS Access-Request destined for the MS's home GPRS system. The IIF does not include the Calling-Station-ID attribute in the RADIUS Access-Request sent to the home AAA in the GPRS system. If the Calling-Station-ID attribute in the received RADIUS Access-Request contains MIN or IRM, the IIF maps it to the MS's IMSI used in the home GPRS system and include it in the 3GPP-IMSI attribute of the RADIUS Access-Request destined for the home GPRS system. The IIF does not include the Calling-Station-ID attribute in the RADIUS Access-Request sent to the home AAA in the GPRS system.

The IIF includes the Called-Station-ID attribute in the RADIUS Access-Request destined for the MS's home GPRS system. The Value field of the Called-Station-ID attribute is set to the APN (see section 8.3.4). If the Framed-Protocol attribute is included in the received RADIUS Access-Request, the IIF overrides the value to 7 [3GPP TS 29.061]. The IIF removes all 3GPP2 VSAs from the received RADIUS Access-Request. The IIF is not required to include any 3GPP VSAs, except the 3GPP-IMSI attribute, in the transmitted RADIUS Access-Request destined for the MS's home GPRS system.

The IIF requirements to process the RADIUS Access-Accept received from the MS's home GPRS system will now be described.

The IIF proxies all IETF RADIUS attributes without modification. The IIF removes all 3GPP VSAs from the received RADIUS Access-Accept, before transmitting the RADIUS Access-Accept to the visited CDMA2000 packet data system.

If the policy of the home GPRS system requires the roaming MS's data traffic to traverse through the home GPRS system via the IIF, and the HA-Address VSA was included in the corresponding RADIUS Access-Request received earlier from the visited CDMA2000 packet data system, the IIF includes the Reverse-Tunnel-Specification VSA in the transmitted RADIUS Access-Accept destined for the visited CDMA2000 packet data system. The value field of the VSA is set to 1 indicating that reverse tunneling is required.

The IIF requirements to process the RADIUS Accounting-Request START and Accounting-Request INTERIM are the same as the requirements to process the RADIUS Access-Request.

The IIF requirements to process the RADIUS Accounting-Request STOP are the same as the requirements to process the RADIUS Access-Request with the following additional requirements: If the Session-Continue VSA is set to FALSE in the received RADIUS Accounting-Request STOP, and if the IIF has not previously received an Accounting-Request (Start) from another PDSN with the same IP Address (for the case of inter-PDSN handoff with Mobile IP), the IIF inserts the 3GPP-Session-Stop-Indicator VSA to indicate that the PDP session has been terminated.

CDMA2000 Packet Data Foreign Mode with Simple IP

Figure 5A:
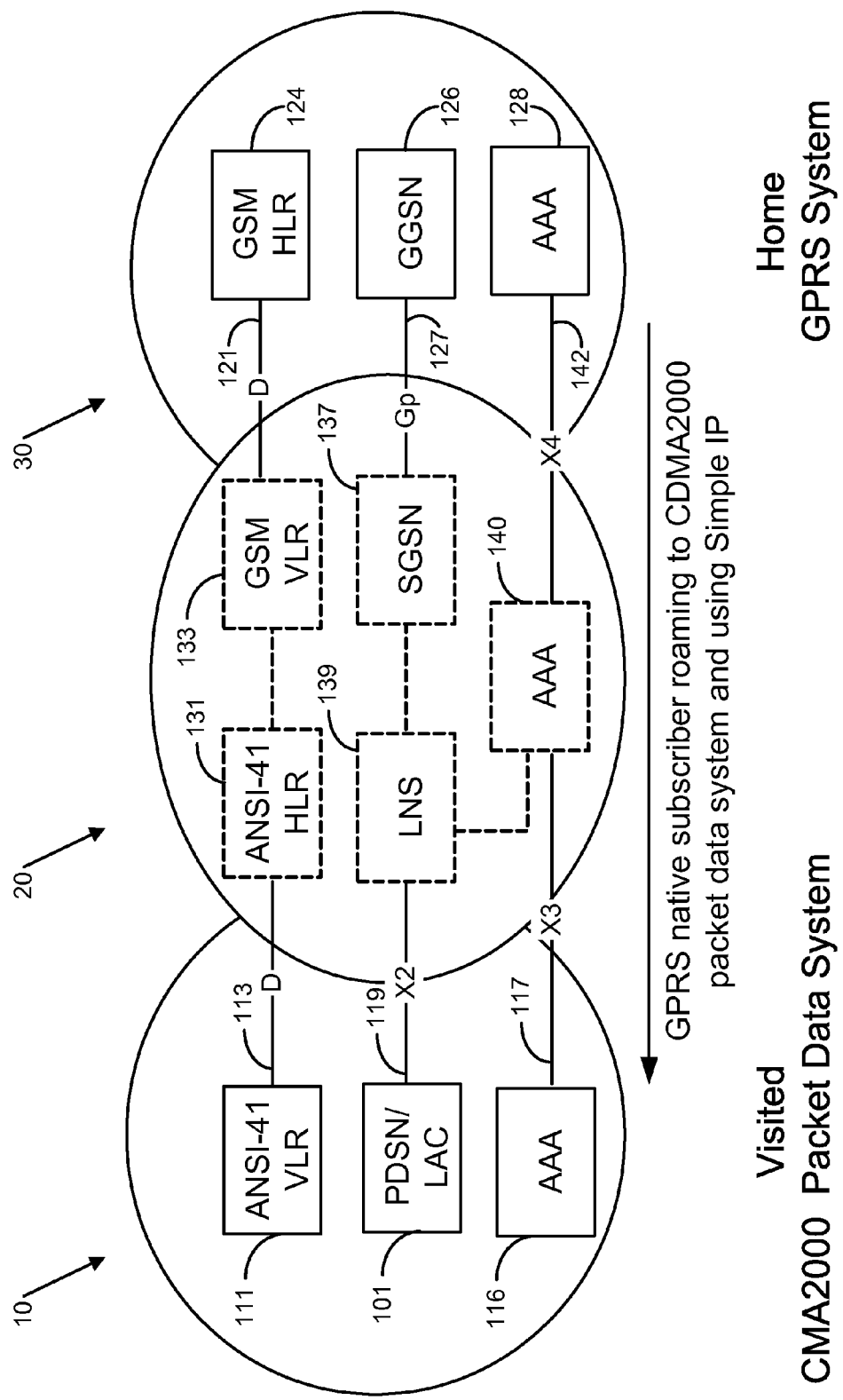
FIG. 5A is a block diagram of CDMA2000 packet data foreign mode with Simple IP.

FIG. 5A is an exemplary block diagram of a CDMA2000 packet data foreign mode with Simple IP. This section describes the roaming scenario where a GPRS native subscriber operates IPv4 or IPv6 in the CDMA2000 packet data foreign mode. FIG. 5A also depicts the functions and control interface provided by the interface 30 or "IIF" in this case. In this embodiment, the home system 10 can be a GPRS system wherein a GPRS native subscriber roams to a CDMA 2000 packet data system and uses Mobile IPv4. The home system 10 comprises a GSM home location register 124, a GGSN 126, and an AAA entity 128. The visited system 20 can be a CDMA 2000 packet data system that comprises a ANSI-41 visited location register 111, an AAA entity 116, and a home system 109.

The interface 30 or "IIF" comprises an ANSI-41 home location register 131 coupled to the ANSI-41 visited location register 111 via a D interface 113, a GSM visited location register 133 coupled to the GSM home location register 124 via a D interface 121, a SGSN 137 coupled to the GGSN 126 via a Gp interface 127, an AAA entity 140 coupled to the AAA entity 128 via a X4 interface 129 and coupled to the AAA entity 116 via a X3 interface 117, and a LCS entity 139 coupled to the packet data serving node/LAC entity 109 via an X2 interface 119. The IIF provides both GSM VLR and ANSI-41 HLR emulation to allow the subscriber to register. This interworking can be provided over the interface reference "D". The IIF provides LNS and SGSN emulation to support bearer connectivity between the visited and home networks via the IIF. This interworking can be provided over the interface reference "X2" and "Gn". The IIF provides AAA emulation to interact with the visited network's AAA for L2TP authentication and 3GPP2 packet data accounting. The IIF also may interact with the home network's AAA for 3GPP packet data accounting. This interworking can be provided over the interface reference "X3" and "X4". The IIF/AAA requirements for CDMA2000 packet data foreign mode with Simple IP will be described below in greater detail.

If bearer connectivity between the visited CDMA2000 packet data system and home GPRS system is not required, the X2 and Gp interface are not required. In this case, both mobile-originated and mobile-terminated data traffic is routed to/from the Internet via the PDSN in the visited system. The interface X3 and X4 are required for the IIF to interwork AAA messages between the CDMA2000 AAA server and GPRS AAA server.

Thus, for a user homed in a GSM system roaming to a CDMA Simple IP system, the IIF may present a L2TP Network Server (LNS) interface to the CDMA system and a SGSN interface to the GSM system. A subset of SGSN functions is required including APN resolution. The IIF may serve as the endpoint for the Mobile L2TP and GTP tunnels, with a packet routing function between the LNS and SGSN functions.

FIG. 5B is an exemplary call flow diagram that shows Simple IP operation in the CDMA2000 packet data foreign mode. This call flow example illustrates a roaming scenario where a GPRS native subscriber operates Simple IP in the CDMA2000 packet data foreign mode. In this example, the MS has shared secrets with the home AAA in the GPRS system for CHAP authentication. The home GPRS system dynamically assigns an IP address to the MS. All MS's data traffic (MS-originated and mobile terminated) traverses through the IIF and home GPRS system. The IIF receives 3GPP2 accounting records from the visited CDMA2000 system and maps it to 3GPP accounting records and forward it to the home GPRS system via RADIUS.

The MS originates SO 33 and initiates PPP LCP negotiation with the PDSN/LAC. CHAP can be negotiated as the protocol for PPP authentication. (Step 1) PDSN/LAC sends a CHAP challenge to the MS. (Step 2) The MS replies with its NAI and a challenge response computed based on the challenge and the secret shared with the home AAA in the GPRS system. The PDSN/LAC sends RADIUS Access-Request. Because the domain name of the MS's NAI indicates a GPRS system, the RADIUS Access-Request can be routed through the visited AAA and IIF that proxies the message to the home AAA in the GPRS system. The IIF may modify the message in accordance with [3GPP TS 29.061]. (Step 3) If the authentication is successful, the home AAA responds with the RADIUS Access-Accept. The message can be routed back to the PDSN/LAC via the IIF and visited AAA. The IIF inserts the Tunnel-Server-Endpoint attribute in the RADIUS Access-Accept. This attribute informs the PDSN/LAC to establish a L2TP tunnel with the IIF that acts as the LNS. The PDSN/LAC sends the CHAP Success to inform the MS about the successful authentication. (Step 4)

The PDSN/LAC establishes a L2TP tunnel/session with the IIF that acts as the LNS. During the L2TP tunnel/session establishment, the PDSN/LAC forwards the LCP information (exchanged between the MS and PDSN/LAC) to the IIF. The IIF LNS functionality may initiate CHAP challenge (not shown in the figure) to authenticate the MS before IPCP negotiation. (Step 5) The IIF SGSN functionality establishes GTP tunnels with a GGSN in the home GPRS system and can request an IP address from the GGSN. The IIF derives an APN that has the format <Network ID>.mnc<MNC>.mcc<MCC>.gprs. The <Network ID> is the realm portion of the MS's NAI and is used to indicate which GGSN the MS wants to access for the requested service. The <MNC> and <MCC> are derived from the MS's IMSI. The MS's NAI and IMSI are available from the RADIUS Access-Request in step 3. The IIF SGSN functionality uses the derived APN as the lookup name to query GPRS DNS server (not shown in the figure) and obtains a list of available GGSNs that can be used to support the requested service. The IIF SGSN functionality sends the Create PDP Context Request to the selected GGSN. The Requested PDP Address in the message is set to 0.0.0.0 to request a new IP address. (Step 6) The GGSN responds with the Create PDP Context Response including the new IP address assigned to the MS. (Step 7)

This new IP address can be assigned to the MS during the PPP IPCP negotiation between the IIF and MS. (Step 8) The PDSN/FA sends the RADIUS Accounting-Request (Start) containing 3GPP2 packet data accounting information [IS-835]. The PDSN sends the RADIUS Accounting-Request (Start) containing 3GPP2 packet data accounting information [P.S0001-A V3.0]. Because the domain name of the MS's NAI indicates a GPRS system, the RADIUS Accounting-Request (Start) is routed to the home AAA in the GPRS system via the visited AAA and IIF. The IIF may modify the message in accordance with [3GPP TS 29.061]. (Step 9) The home AAA replies with the RADIUS Accounting-Response (Start) that is routed back to the PDSN via IIF and visited AAA. (Step 10)

Bearer traffic traverses through the IIF in both directions. For routing MS-originated packets, the IIF routes packets received from the MS's L2TP tunnel/session to the MS's GTP tunnel (identified by a TEID). For routing MS-terminated packets, the IIF routes packets received from the MS's GTP tunnel to the MS's L2TP tunnel/session. IPsec can be used to protect the L2TP tunnel/session between PDSN/LAC and IIF, and the GTP tunnels between IIF and GGSN. (Step 11)

IIF/AAA Requirements for CDMA2000 Packet Data Foreign Mode with Simple IP

The IIF requirements to process the RADIUS Access-Request are the same as the requirements to process the RADIUS Access-Request for the CDMA2000 Packet Data Foreign Mode with Mobile IP, described above.

The IIF requirements to process the RADIUS Access-Accept are similar to the requirements for processing the RADIUS Access-Accept for the CDMA2000 Packet Data Foreign Mode with Mobile IP, however, if the policy of the home GPRS system requires the roaming MS's data traffic to traverse through the home GPRS system via the IIF, and the HA-Address VSA was not included in the corresponding RADIUS Access-Request received earlier from the visited CDMA2000 packet data system, the IIF inserts the Tunnel-Server-Endpoint, Tunnel-Type, and Tunnel-Medium-Type attributes in the transmitted RADIUS Access-Accept destined for the visited CDMA2000 packet data system. The Tunnel-Server-Endpoint attribute indicates the IIF/LNS address. The Tunnel-Type attribute indicates L2TP. The Tunnel-Medium-Type attribute indicate IPv4.

The IIF requirements to process the RADIUS Accounting-Request START and Accounting-Request INTERIM are the same as the requirements to process the RADIUS Accounting-Request START and Accounting-Request INTERIM for the CDMA2000 Packet Data Foreign Mode with Mobile IP, described above.

The IIF requirements to process the RADIUS Accounting-Request STOP are the substantially the same as the requirements to process the RADIUS Accounting-Request STOP for the CDMA2000 Packet Data Foreign Mode with Mobile IP, however, if the Session-Continue VSA is set to FALSE in the received RADIUS Accounting-Request STOP, and the IP-Technology VSA indicates Simple IP, the IIF inserts the 3GPP-Session-Stop-Indicator VSA to indicate that the PDP session has been terminated.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality can be implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments can be provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention can be not intended to be limited to the embodiments shown herein but can be to be accorded the widest scope consistent with the principles and novel features disclosed herein.

What is claimed is:

1. An apparatus for enabling communications between a CDMA (Code Division Multiple Access) packet data system and a GPRS (General Packet Radio Service) system, wherein a CDMA 2000 packet data native subscriber using Mobile IPv4 (Internet Protocol version 4) roams from a home CDMA 2000 packet data system to a visited GPRS system comprising a SGSN (Serving GPRS Support Node), comprising:
    means for coupling the home system to the visited system to enable communication between the home system and the visited system, wherein the home CDMA 2000 packet data system comprises a ANSI (American National Standards Institute)-41 home location register, an AAA (Authentication, Authorization, and Accounting) entity, and a home agent; and
    means for providing a distinct interface for each of the ANSI-41 home location register, the AAA entity, and the home agent.

2. The apparatus according to claim 1, wherein the home CDMA 2000 packet data system
    comprises a ANSI-41 home location register, an AAA entity, and a home agent, further comprising:
    means for allowing a subscriber to register over a first interface; and allowing the subscriber to register over a second interface.

3. The apparatus according to claim 1, further comprising:
    means for supporting bearer connectivity between the visited system and the home system such that a foreign agent interface and an AAA interface are presented to the CDMA 2000 packet data system over a third interface; and
    means for supporting bearer connectivity between the visited system and the home system such that a GGSN (Gateway GPRS Support Node) interface is presented to the visited system over a fourth interface.

4. The apparatus according to claim 3, further comprising: means for providing an endpoint for a GTP (GPRS Tunneling Protocol) tunnel and a Mobile IP tunnel.

5. The apparatus according to claim 4, further comprising: means for providing a packet routing function between the GGSN interface and a foreign agent interface.

6. The apparatus according to claim 1, further comprising:
    means for providing an accounting function by interacting with a home network's AAA for Mobile IP Foreign Agent challenge authentication and 3GPP2 (3rd Generation Partnership Project 2) packet data accounting.

7. The apparatus for enabling communications between a CDMA (Code Division Multiple Access) packet data system and a GPRS (General Packet Radio Service) system, wherein a CDMA 2000 packet data native subscriber using Simple IP roams from a home CDMA 2000 packet data system to a visited GPRS system comprising a SGSN, (Serving GPRS Support Node) comprising:
    means for coupling the home system to the visited system to enable communication between the home system and the visited system,
    wherein the home CDMA 2000 packet data system comprises a ANSI-41 home location register, an AAA (Authentication, Authorization, and Accounting) entity, and a LNS (Layer 2 Tunneling Protocol Network Server); and
    means for providing a distinct interface for each of the ANSI-41 home location register, the AAA entity, and LNS.

8. The apparatus according to claim 7, further comprising: means for allowing a subscriber to register over a first interface; and allowing the subscriber to register over a second interface.

9. The apparatus according to claim 8, further comprising:
    means for supporting bearer connectivity between the visited and home networks over a third interface; and
    means for supporting bearer connectivity between the visited and home networks over a fourth interface by presenting a GGSN interface to the visited system and presenting a normal routing interface to the CDMA 2000 packet data system to thereby provide a packet routing function between the GGSN interface and the home system.

10. The apparatus according to claim 9, further comprising: means for providing an endpoint for a GTP tunnel and an IPSec tunnel.

11. The apparatus according to claim 10, further comprising:
    means for providing an accounting function by interacting with the home network's AAA for L2TP (Layer 2 Tunneling Protocol) authentication and 3GPP2 packet data accounting over a fifth interface.

12. An apparatus for enabling communications between a CDMA (Code Division Multiple Access) packet data system and a GPRS (General Packet Radio Service) system, wherein a GPRS native subscriber using Mobile IPv4 (Internet Protocol version 4) roams from a home GPRS system to a visited CDMA 2000 packet data system that comprises an ANSI-41 visited location register, an AAA (Authentication, Authorization, and Accounting) entity, and a packet data serving node/foreign agent, comprising:
    means for coupling the home system to the visited system to enable communication between the home system and the visited system,
    wherein the home GPRS system comprises a GSM home location register, a GGSN, and an AAA entity; and
    means for providing a distinct interface for each of the GSM home location register, the GGSN, and the AAA entity.

13. The apparatus according to claim 12, further comprising:
    means for presenting a home agent interface to the visited system; and
    means for presenting a SGSN interface to the home system to support bearer connectivity between the visited and home networks by providing a packet routing function between the SGSN interface and the home agent interface.

14. The apparatus according to claim 13, further comprising: means for providing endpoints for a GTP tunnel and a Mobile IP tunnel.

15. The apparatus according to claim 13, further comprising: means for allowing a subscriber to register.

16. The apparatus according to claim 15, further comprising:
    means for interacting with the visited network's AAA for Mobile IP authentication and 3GPP2 packet data accounting over a fifth interface; and means for interacting with the home network's AAA for 3 GPP packet data accounting over a fourth interface.

17. An apparatus for enabling communications between a CDMA (Code Division Multiple Access) packet data system and a GPRS (General Packet Radio Service) system, wherein a GPRS native subscriber using Simple IP roams from home GPRS system to a visited CDMA 2000 packet data system that comprises a ANSI-41 visited location register, a AAA (Authentication, Authorization, and Accounting) entity, and a PDSN/LAC (Packet Data Serving Node/Layer 2 Tunneling Protocol Access Concentrator) entity, comprising:
 means for coupling the home system to the visited system to enable communication between the home system and the visited system,
 wherein the home GPRS system comprises a GSM home location register, a GGSN, and an AAA entity; and
 means for providing a distinct interface for each of the GSM home location register, the GGSN, and the AAA entity.

18. The apparatus according to claim 17, further comprising:
 means for supporting bearer connectivity between the visited and home networks by providing a packet routing function.

19. The apparatus according to claim 18, further comprising:
 means for presenting a SGSN interface to the home system;
 means for presenting a L2TP Network Server (LNS) interface to the visited system; and
 means for providing the packet routing function between a SGSN emulation module and a LNS emulation module.

20. The apparatus according to claim 19, further comprising: means for providing endpoints for a GTP tunnel and a Mobile L2TP tunnel.

21. The apapratus according to claim 20, further comprising: allowing a subscriber to register.

22. The apparatus according to claim 21, further comprising:
 means for interacting with the visited network's AAA entity, over an fifth interface, for L2TP authentication and 3GPP2 packet data accounting; and
 means for interacting with the home network's AAA entity, over an sixth interface, for 3GPP packet data accounting.

23. An apparatus for enabling communication between a home CDMA 2000 packet data system and a visited GPRS (General Packet Radio Service) system comprising a SGSN (Serving GPRS Support Node), when a CDMA 2000 packet data native subscriber using Mobile IPv4 roams to a visited GPRS system, the apparatus comprising:
 means for allowing a subscriber to register over a first interface that couples a GSM home location register emulation module to the SGSN; and
 means for allowing the subscriber to register over a second interface that couples an ANSI-41 visited location register emulation module to a ANSI-41 home location register.

24. The apparatus according to claim 23, wherein the home CDMA 2000 packet data interface entity comprises a ANSI-41 home location register, an AAA entity, and a home agent.

25. The apparatus according to claim 23, further comprising:
 means for coupling the home agent to a foreign agent emulation module via a third interface, wherein the foreign agent emulation module supports bearer connectivity between the visited interface entity and the home interface entity such that a foreign agent interface and an AAA interface are presented to the CDMA 2000 packet data interface entity over the third interface; and
 means for coupling a GGSN emulation module to the SGSN via a fourth interface, wherein the GGSN emulation module supports bearer connectivity between the visited interface entity and the home interface entity such that a GGSN interface is presented to the visited interface entity over the fourth interface.

26. The apparatus according to claim 25, further comprising:
 means for providing endpoints for a GTP tunnel and a Mobile IP tunnel.

27. The apparatus according to claim 26, further comprising:
 means for providing a packet routing function between the GGSN interface and the foreign agent interface.

28. The apparatus according to claim 23, further comprising:
 means for coupling an AAA emulation module to the AAA entity via an fifth interface,
 wherein the AAA emulation module provides an accounting function by interacting with a home network's AAA for Mobile IP Foreign Agent challenge authentication and 3GPP2 packet data accounting.

29. An apparatus that enables communication between a home CDMA (Code Division Multiple Access) 2000 packet data system and a visited GPRS (General Packet Radio Service) system comprising a SGSN (Serving GPRS Support Node), when a CDMA 2000 packet data native subscriber using Simple IP roams to a visited GPRS system, wherein the home CDMA2000 packet data system comprises a ANSI-41 home location register, an AAA entity, and a LNS, comprising:
 an ANSI-41 visited location register;
 a GSM home location register;
 means for coupling the ANSI-41 visited location register to the ANSI-41 home location register via a first interface, wherein the ANSI-41 visited location register allows a subscriber to register over the first interface; and
 means for coupling the GSM home location register to the SGSN via a second interface, wherein the GSM home location register allows a subscriber to register over the second interface.

30. The apparatus according to claim 29, further comprising:
 means for coupling a LAC (Layer 2 Tunneling Protocol Access Concentrator) emulation module to the LNS (Layer 2 Tunneling Protocol Network Server) via an third interface, wherein the LAC emulation module supports bearer connectivity between the visited and home networks over the third interface; and
 means for coupling a GGSN emulation module to the SGSN via a fourth interface, wherein the GGSN emulation module supports bearer connectivity between the visited and home networks over the fourth interface by:
 means for presenting a GGSN interface to the visited system; and
 means for presenting a normal routing interface to the CDMA 2000 packet data system to thereby provide a packet routing function between the GGSN interface and the home system.

31. The apparatus according to claim 29, further comprising: means for providing endpoints for a GTP tunnel and an IPSec tunnel.

32. The apparatus according to claim 31, further comprising:
means for coupling an AAA emulation module to the AAA entity via a fifth interface, wherein the AAA emulation module provides an accounting function by:
means for interacting with the home network's AAA for L2TP authentication and 3GPP2 packet data accounting over the fifth interface.

33. An apparatus that enables communication between a home GPRS (General Packet Radio Service) system comprising a GSM home location register, a GGSN, and an AAA (Authentication, Authorization, and Accounting) entity; and a visited CDMA 2000 packet data system that comprises an ANSI-41 visited location register, an AAA entity, and a packet data serving node/foreign agent, when a GPRS native subscriber using Mobile IPv4 (Internet Protocol version 4) roams to the visited CDMA 2000 packet data system, comprising:
means for coupling a home agent emulation module to the packet data serving node/foreign agent via a first interface, wherein the home agent emulation module presents a home agent interface to the visited system; and
means for coupling a SGSN emulation module to the GGSN via a second interface, wherein the SGSN emulation module presents a SGSN interface to the home system to support bearer connectivity between the visited and home networks by providing a packet routing function between the SGSN interface and the home agent interface.

34. The apparatus according to claim 33, further comprising:
means for providing endpoints for a GTP tunnel and a Mobile IP tunnel.

35. The apparatus according to claim 33, further comprising:
means for coupling a ANSI-41 home location register emulation module to the ANSI-41 visited location register via a third interface; and
means for coupling a GSM visited location register emulation module to the GSM home location register via another third interface to allow a subscriber to register.

36. The apparatus according to claim 35, further comprising:
means for coupling a AAA emulation module to the AAA entity via a fourth interface and to the AAA entity via a fifth interface, wherein the AAA emulation module interacts with:
the visited network's AAA for Mobile IP authentication and 3GPP2 packet data accounting, over the fifth interface, and
the home network's AAA for 3GPP packet data accounting, over the fourth interface.

37. An apparatus that enables communication between a home GPRS (General Packet Radio Service) system comprising a GSM home location register, a GGSN, and an AAA (Authentication, Authorization, and Accounting) entity, and a visited CDMA 2000 packet data system that comprises an ANSI-41 visited location register, an AAA entity, and a packet data serving node/LAC entity, when a GPRS native subscriber using Simple IP roams to the visited CDMA 2000 packet data system, comprising:
means for coupling a SGSN emulation module to the GGSN over a first interface, wherein the SGSN emulation module presents a SGSN interface to the home system; and
means for coupling a LNS emulation module to the packet data serving node/LAC entity over a second interface, wherein the LNS emulation module presents a L2TP Network Server (LNS) interface to the visited system,
wherein the interface provides the packet routing function between the SGSN emulation module and the LNS emulation module.

38. The apparatus according to claim 37, wherein bearer connectivity is supported between the visited and home networks by providing a packet routing function.

39. The apparatus according to claim 38, further comprising: means for providing endpoints for a GTP tunnel and a Mobile L2TP tunnel.

40. The apparatus according to claim 38, further comprising:
means for coupling a ANSI-41 home location register emulation module to the ANSI-41 visited location register via a third interface, wherein the ANSI-41 home location register emulation module allows a subscriber to register; and
means for coupling a GSM visited location register emulation module to the GSM home location register via another third interface,
wherein the GSM visited location register emulation module allows the subscriber to register.

41. The apparatus according to claim 40, further comprising:
means for coupling an AAA emulation module to the AAA entity via a fourth interface and coupled to the AAA entity via a fifth interface, wherein the AAA emulation module interacts with:
the visited network's AAA entity, over an fifth interface, for L2TP authentication and 3GPP2 packet data accounting, and
the home network's AAA entity, over an sixth interface, for 3GPP packet data accounting.

* * * * *